United States Patent
Moravcik et al.

(10) Patent No.: US 9,465,481 B2
(45) Date of Patent: Oct. 11, 2016

(54) METHOD FOR PERFORMING TOUCH DETECTION AND TOUCH DETECTION MODULE THEREFOR

(76) Inventors: Peter Moravcik, Zvolen (SK); Martin Mienkina, Bystrice (CZ)

( * ) Notice: Subject to any disclaimer, the term of this patent is extended or adjusted under 35 U.S.C. 154(b) by 0 days.

(21) Appl. No.: 14/417,648

(22) PCT Filed: Aug. 3, 2012

(86) PCT No.: PCT/IB2012/053995
§ 371 (c)(1),
(2), (4) Date: Jan. 27, 2015

(87) PCT Pub. No.: WO2014/020380
PCT Pub. Date: Feb. 6, 2014

(65) Prior Publication Data
US 2015/0212648 A1 Jul. 30, 2015

(51) Int. Cl.
*G06F 3/041* (2006.01)
*G06F 3/044* (2006.01)

(52) U.S. Cl.
CPC ............. *G06F 3/0418* (2013.01); *G06F 3/044* (2013.01)

(58) Field of Classification Search
CPC ................... G06F 3/041–3/047; G06F 17/14; G06F 17/142; H03F 1/3247; H03F 1/3294; H03F 2200/228
See application file for complete search history.

(56) References Cited

U.S. PATENT DOCUMENTS

| 7,023,249 | B1* | 4/2006 | Mulbrook | ............... | H03L 7/093 327/156 |
| 7,337,085 | B2 | 2/2008 | Soss | | |
| 7,504,833 | B1 | 3/2009 | Seguine | | |
| 8,766,944 | B2* | 7/2014 | Ksondzyk | ............ | G06K 3/0148 178/18.01 |
| 2007/0032967 | A1* | 2/2007 | Feen | ..................... | H03K 17/955 702/47 |
| 2008/0309353 | A1* | 12/2008 | Cheung | ................ | H03K 17/962 324/674 |
| 2010/0307840 | A1 | 12/2010 | Kobayashi et al. | | |
| 2011/0120784 | A1* | 5/2011 | Osoinach | ................ | G06F 3/038 178/18.06 |
| 2011/0241907 | A1 | 10/2011 | Cordeiro | | |
| 2012/0176179 | A1* | 7/2012 | Harders | ............... | H03K 17/962 327/517 |

FOREIGN PATENT DOCUMENTS

| EP | 2224318 A1 | 9/2010 |
| KR | 10-2011-0030198 A | 3/2011 |
| KR | 10-2012-0018252 A | 3/2012 |

OTHER PUBLICATIONS

International Search Report and Written Opinion correlating to PCT/IB2012/053995 dated Dec. 28, 2012.
MICROCHIP: "mTouch User's Guide", 2007 Microchip Technology Inc., pp. 1-56.
Srinivasagam et al: "Differentiating Noise from Real Touch: The Key to Robust Capacitive Sensing", weblink: http://www.eetimes.com/document.asp?doc_id=1278360, EE/Times, Oct. 10, 2010, pp. 1-6.

* cited by examiner

*Primary Examiner* — Sanjiv D Patel

(57) ABSTRACT

A method and apparatus for performing touch detection within a touch sensing application is described. Touch sensor signal data is received, a first filtering of the received touch sensor signal data to create a first filtered data signal is performed, a second filtering of the received touch sensor signal data to create a second filtered data signal is also performed, a difference between the first and second filtered data signals to determine a delta value is calculated, and an occurrence of a touch based at least partly on the determined delta value is determined.

10 Claims, 3 Drawing Sheets

METHOD FOR PERFORMING TOUCH DETECTION AND TOUCH DETECTION MODULE THEREFOR

FIELD OF THE INVENTION

The field of this invention relates to a method for performing touch detection and a touch detection module therefor.

BACKGROUND OF THE INVENTION

Capacitive touch sensor devices have been incorporated into a range of electronic devices, including mobile communication devices, such as cellular telephones, computers, portable entertainment devices, appliances and touch screens, to name but a few. At a minimum, a capacitive touch sensor device includes one or more touch sensors, each of which is configured to indicate a capacitance change when, for example, the sensor is touched (e.g. by a stylus or a user's finger). Such changes in capacitance may then be processed in order to detect when the sensor has been touched.

In a conventional touch sensing application, a capacitance of the sensor is sampled and a baseline value is subtracted from the sampled value to derive a delta value. The delta value is then compared to a threshold value. If the delta value is greater than the threshold value, then a touch is detected, where as if the delta value is less than the threshold value then no touch is detected.

In order to accommodate for changes in ambient operating conditions and sensitivity changes, it is known to dynamically update the baseline value. For example, a typically technique for such dynamic updating of the baseline value is to implement a simple convergence of the baseline value to the sampled signal value when no touch is detected. In this manner, the baseline value will 'track' the sampled data value as long as no touch is detected.

However, touch sensing applications are often subjected to large amounts of electromagnetic noise effects, which can cause significant disturbances to the sampled capacitance signal. Specifically, such disturbances can cause fluctuations in the sampled data signal. Such noise fluctuations can result in the delta value for the sampled data dipping below the threshold value during a touch event, giving a false 'not touch detected' reading. Such false 'not touch detected' readings result in inappropriate tracking of the baseline value to the sampled data value during a touch event. As a consequence, the baseline value is inappropriately increased, increasing the vulnerability of the touch sensing components to noise fluctuations, and reducing the ability of the touch sensing components to detect touches.

In order to minimise the effect of electromagnetic noise, filtering may be applied to the sampled data prior to deriving the delta value. However, such filtering can reduce the sensitivity of the touch sensing components, making setting of the threshold value difficult for reliable touch recognition.

SUMMARY OF THE INVENTION

The present invention provides a method of performing touch detection within a touch sensing application and a touch detection module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

The present invention will now be described with reference to an example of a touch detection module according to some examples of the present invention. However, it will be appreciated that the present invention is not limited to the specific embodiment herein described. Furthermore, because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
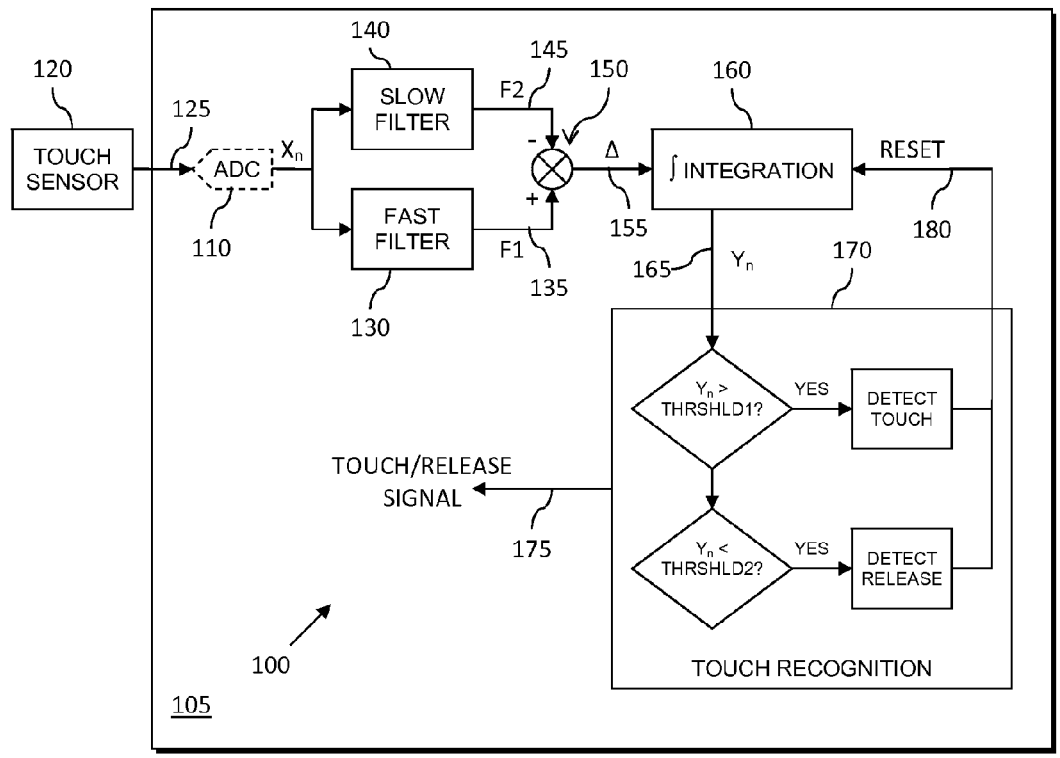
FIG. 1 illustrates a simplified block diagram of an example of a touch detection module.

Referring first to FIG. 1, there is illustrated a simplified block diagram of an example of a touch detection module 100, which in the illustrated example is implemented within an integrated circuit device 105 comprising at least one die within a single integrated circuit package. The touch detection module 100 is operably coupled to one or more touch sensors 120, such touch sensors 120 comprising, for example, capacitive touch sensors. In this manner, the touch detection module 100 is arranged to receive touch sensor signal data 125 from the one or more touch sensor(s) 120, for example such signal data comprising an indication of changes in capacitance detected by the respective touch sensor 120.

The touch detection module 100 comprises a first filter component 130 arranged to receive the touch sensor signal data 125 and to perform a first filtering of the received touch sensor signal data 125 to create a first filtered data signal (F1) 135. The touch detection module 100 further comprises a second filter component 140 arranged to receive the touch sensor signal data 125 and to perform a second filtering of the received touch sensor signal 125 to create a second filtered data signal (F2) 145. In the illustrated example, the first filter component 130 is arranged to perform filtering of the received touch sensor signal 125 comprising either a first ('fast') transfer function or a unity transfer function, whilst the second filter component 140 is arranged to perform filtering of the received touch sensor signal 125 comprising a second ('slow') transfer function. For example, in one example, the first filter component 130 may be arranged to implement a transfer function of:

$$F1_n=(X_n+(19*F1_{n-1}))/20 \quad \text{[Equation 1]}$$

whilst the second filter component 140 may be arranged to implement a transfer function of:

$$F2_n=(X_n+(199*F2_{n-1})/200 \quad \text{[Equation 2]}$$

Figure 2:
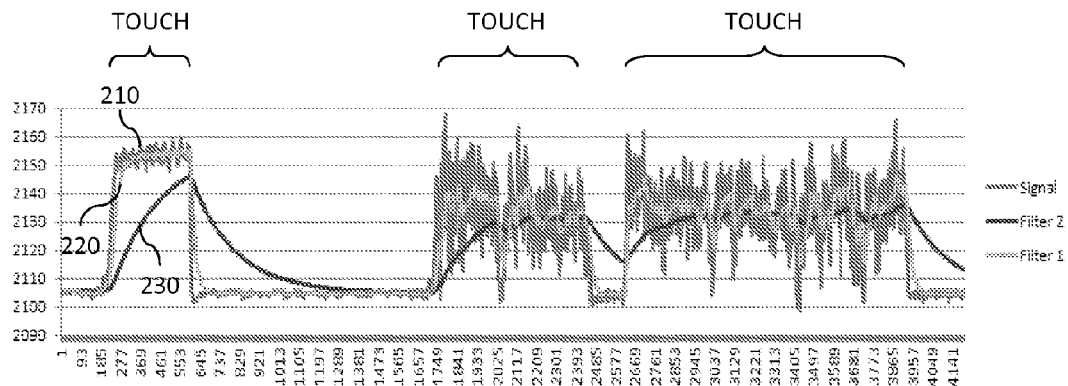
FIG. 2 illustrates a simplified graph showing plots that are representative of a touch sensor data signal and first and second filtered data signals.

In this manner, and as illustrated in FIG. 2, the first filtered data signal (F1) 135, represented by plot 220 in FIG. 2, may be filtered in such a manner as to comprise a relatively faster impulse response, thereby being relatively sensitive to changes within the received touch sensor signal data 125. As such, the plot 220 of the first filtered data signal (F1) 135 follows the received touch sensor signal 125, represented by plot 210 in FIG. 2, relatively closely. However, as illustrated towards the right hand side of FIG. 2, the first filtered data signal (F1) 135 is prone to noise within the received touch sensor signal 125. In contrast, the second filtered data signal (F2) 145, represented by plot 230 in FIG. 2, may be filtered in such a manner as to comprise a relatively slower impulse response, thereby enabling noise within the received touch sensor signal data 125 to be effectively filtered out of the second filtered data signal (F2) 145.

In the illustrated example, the second filtered data signal (F2) 145 is then subtracted from the first filtered data signal (F1) 135, at 150, to calculate a difference between the first and second filtered data signals 135, 145. The difference between the first and second filtered data signals 135, 145 is output as a delta value (Δ) 155.

Figure 3:
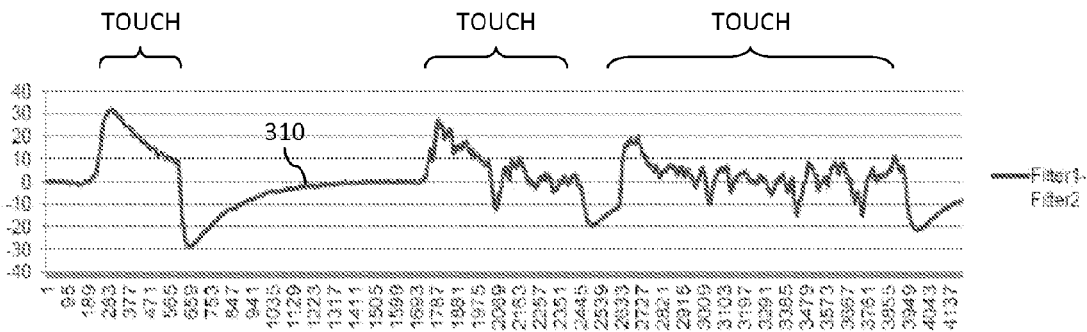
FIG. 3 illustrates a simplified graph showing a plot that is representative of a delta value ($\Delta$) for the first and second filtered data signals illustrated in FIG. 2.

FIG. 3 illustrates a simplified graph showing a plot 310 representative of the delta value (Δ) 155 for the first and second filtered data signals 135, 145 illustrated in FIG. 2. As can be seen in FIG. 3, it is possible to discern within the delta value (Δ) 155 those points in time when a touch occurred as a result of the relatively faster impulse response of the first filtered data signal (F1) 135, whilst the noise present within the received touch sensor signal 125 is significantly reduced as a result of the relatively slower impulse response of the second filtered data signal (F2) 145. As such, an occurrence of a touch may be detected based at least partly on the delta value (Δ) 155.

For example, and as illustrated in FIG. 1, the touch detection module 100 may further comprise an integration component 160 arranged to perform integration of the determined delta value (Δ) 155 to generate an integrated delta value ($Y_n$) 165, where $Y_n=\Delta+Y_{n-1}$. The touch detection module 100 further comprises a touch recognition module 170 arranged to receive the integrated delta value ($Y_n$) 165, and to detect an occurrence of a touch based at least partly on the integrated delta value ($Y_n$) 165. For example, in the illustrated example, the touch recognition module 170 is arranged to compare the integrated delta value ($Y_n$) 165 to a first threshold value, and to detect an occurrence of a touch if the integrated delta value ($Y_n$) 165 exceeds (in magnitude) the first threshold value. In particular for the illustrated example, and as illustrated in FIG. 3, when a touch occurs, the delta value (Δ) 155 comprises an initially significant positive value, which subsequently decreases back towards a substantially zero value. Thus, by comparing the integrated delta value ($Y_n$) 165 to a first, positive threshold value, a touch may be detected if the integrated delta value ($Y_n$) 165 becomes greater than the first, positive threshold value, and a corresponding touch detection signal output at 175.

In the illustrated example, the touch recognition module 170 is arranged to compare the integrated delta value ($Y_n$) 165 to a second threshold value, and to detect an occurrence of a release if the integrated delta value ($Y_n$) 165 exceeds (in magnitude) the second threshold value. In particular for the illustrated example, and as illustrated in FIG. 3, when a release occurs, the delta value (Δ) 155 comprises an initially significant negative value, which subsequently decreases (in magnitude) back towards a substantially zero value. Thus, by comparing the integrated delta value ($Y_n$) 165 to a second, negative threshold value, a release may be detected if the integrated delta value ($Y_n$) 165 becomes less than the second, negative threshold value, and a corresponding release detection signal output at 175.

In the illustrated example, the touch recognition module 170 is further arranged to output a reset signal 180 to reset the integrated delta value ($Y_n$) 165 to an initial value, for example to zero, upon a touch or a release being detected.

Figure 4:
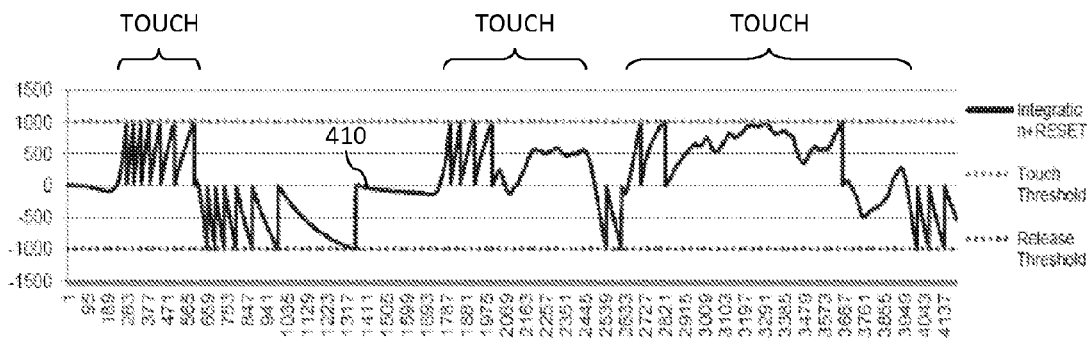
FIG. 4 illustrates a simplified graph showing a plot that is representative of an integrated delta value ($Y_n$) for the touch sensor signal data illustrated in FIG. 2.

FIG. 4 illustrates a simplified graph showing a plot 410 representative of the integrated delta value ($Y_n$) 165 for the touch sensor signal data 125 illustrated in FIG. 2. The graph also shows resetting of the integrated delta value ($Y_n$) 165 if the integrated delta value ($Y_n$) 165 exceeds one of the thresholds used for detection of a touch event or a release event.

Figure 5:
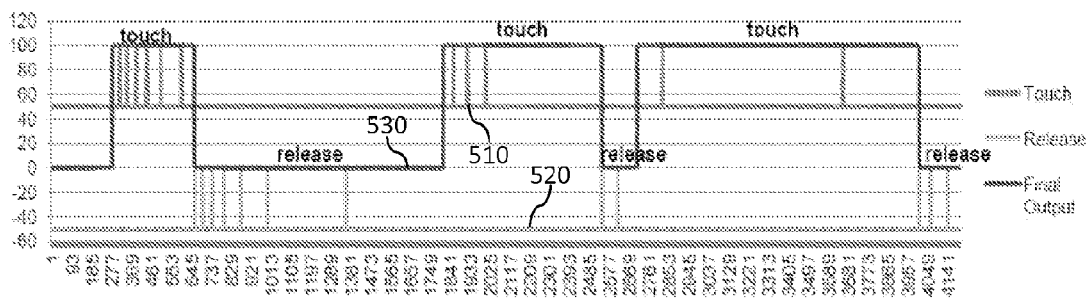
FIG. 5 illustrates a simplified graph showing a first plot of detected touch signals, a second plot of detected release signals, and a third plot of an example of an overall output signal for the integrated delta value ($Y_n$) of FIG. 4.

FIG. 5 illustrates a simplified graph showing a first plot 510 of detected touch signals from the integrated delta value ($Y_n$) 165 of FIG. 4, a second plot 520 of detected release signals from the integrated delta value ($Y_n$) 165 of FIG. 4, and a third plot 530 of an example of an overall output signal 175 for the integrated delta value ($Y_n$) 165 of FIG. 4.

Advantageously, the filtering and delta integration herein described provides greater noise immunity that conventional prior art techniques for touch recognition that rely on a common baseline approach, in particular due to the continual processing of the received sensor signal data 125 during both a touch condition and a release condition. Furthermore, delta integration complemented with the reset functionality enables higher sensitivity, and thereby more precise threshold settings. In some examples, the threshold values used within the touch recognition module 170 may be configurable, for example by way of programmable registers (not shown). In this manner, the sensitivity etc. of the touch detection module 100 may be configurable.

In the illustrated example, the touch detection module 100 is arranged to perform touch detection within the digital domain, for example within a microcontroller unit (MCU), field programmable gate array (FPGA), programmable logic device (PLD), application specific integrated circuit (ASIC) device, etc. As such, the one or more touch sensor(s) 120 may be arranged to provide signal data 125 to the touch detection module 100 in a digital form. Alternatively, the touch detection module 100 may comprise an analogue to digital converter 110 arranged to convert the signal data 125 received from the touch sensor(s) 120 from analogue to digital form.

Figure 6:
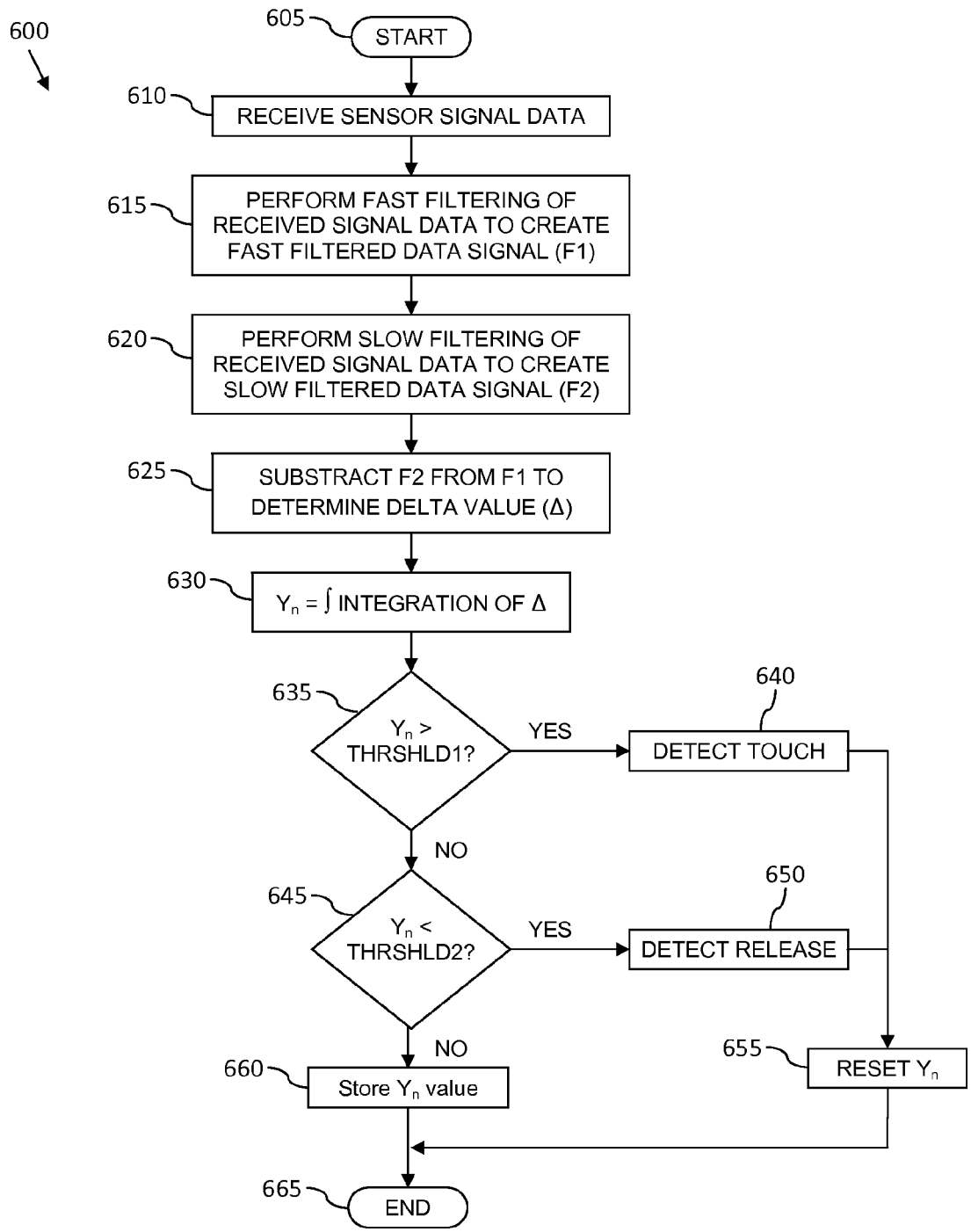
FIG. 6 illustrates a simplified flowchart of an example of a method of performing touch detection.

Referring now to FIG. 6, there is illustrated a simplified flowchart 600 of an example of a method of performing touch detection within a touch sensing application, such as may be implemented within the touch detection module 100 of FIG. 1. The method starts at 605, and moves on to 610 with the receipt of sensor signal data. Next, at 615, a first, 'fast' filtering of the received sensor signal data is performed to create a first, fast filtered data signal (F1). A second, 'slow' filtering of the received sensor signal data is also performed, at 620, to create a second, slow filtered data signal (F2). Next, at 625, the second, slow filtered data signal (F2) is subtracted from the first, fast filtered data signal (F1) to determine a delta value ($\Delta$).

Integration of the determined delta value ($\Delta$) is then performed, at 630, to generate an integrated delta value ($Y_n$). The integrated delta value ($Y_n$) is then compared to first (e.g. positive) threshold value, at 635, to determine whether the integrated delta value ($Y_n$) exceeds (e.g. is greater than) the first threshold value. If the integrated delta value ($Y_n$) does exceed the first threshold value, the method moves on to 640 where a touch is detected. The integrated delta value ($Y_n$) is then reset at 655, and the method ends at 665.

Referring back to 635, if the integrated delta value ($Y_n$) does not exceed the first threshold value, the method moves on to 645, where the integrated delta value ($Y_n$) is compared to a second (e.g. negative) threshold value to determine whether the integrated delta value ($Y_n$) exceeds (e.g. is less than) the second threshold value. If the integrated delta value ($Y_n$) does exceed the second threshold value, the method moves on to 650 where a release is detected. The integrated delta value ($Y_n$) is then reset at 655, and the method ends at 665.

Referring back to 645, if the integrated delta value ($Y_n$) does not exceed the second threshold value, the delta value ($Y_n$) is stored for integration in the next calculation at 660, and the method ends at 665.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected', or 'operably coupled', to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an', as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an'. The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of performing touch detection within an integrated circuit, the method comprising:
    receiving touch sensor signal data from a touch sensor;
    filtering, using a first filter, the received touch sensor signal data to create a first filtered data signal;
    filtering, using a second filter, the received touch sensor signal data to create a second filtered data signal;
    calculating a difference between the first and second filtered data signals to determine a delta value;
    integrating, using an integrator, the determined delta value to generate an integrated delta value;
    detecting an occurrence of a touch based on the integrated delta value exceeding a first threshold value;
    detecting an occurrence of a sensor release based on the integrated delta value exceeding a second threshold value; and
    resetting the integrated delta value to an initial value each time the touch is detected and each time the sensor release is detected.

2. The method of claim 1, wherein
    filtering using the first filter comprises calculating a first transfer function, and
    filtering using the second filter comprises calculating a second transfer function.

3. The method of claim 2, wherein the method comprises performing the filtering using a first filter comprising a relatively faster impulse response and performing the filtering using a second filter comprising a relatively slower impulse response.

4. The method of claim 2, wherein at least one of the first and second transfer functions is configurable.

5. The method of claim 1, wherein detecting the occurrence of the touch comprises
    comparing the integrated delta value to the first threshold value.

6. The method of claim 1, wherein detecting the occurrence of the sensor release comprises comparing the integrated delta value to the second threshold value.

7. The method of claim 1, wherein the method comprises receiving touch sensor signal data from a capacitive touch sensor.

8. The method of claim 1, wherein the method comprises performing touch detection within a digital domain of the integrated circuit.

9. An integrated circuit comprising:
    a touch sensor;
    a touch detection module, coupled to the touch sensor, and configured to receive touch sensor signal data, the touch detection module comprising:
        a first filter for filtering of the received touch sensor signal data to create a first filtered data signal;
        a second filter for filtering of the received touch sensor signal data to create a second filtered data signal;
        a summation circuit for calculating a difference between the first and second filtered data signals to determine a delta value, and;
        an integrator for integrating the delta value to generate an integrated delta value;
        a touch recognition module coupled to an output of the integrator for detecting an occurrence of a touch based on the integrated delta value exceeding a first threshold value, for detecting an occurrence of a sensor release based on the integrated delta value exceeding a second threshold value, and for resetting the integrated delta value to an initial value each time the touch is detected and each time the sensor release is detected.

10. The integrated circuit of claim 9 comprising at least one die within a single integrated circuit package.

* * * * *